Patented Jan. 24, 1933

1,895,062

UNITED STATES PATENT OFFICE

PAUL ZURCHER, OF FLORENCE, COLORADO, ASSIGNOR, BY MESNE ASSIGNMENTS, TO CONTINENTAL OIL COMPANY, OF PONCA CITY, OKLAHOMA, A CORPORATION OF DELAWARE

REVIVIFICATION OF CARBONS

No Drawing.   Application filed August 13, 1928. Serial No. 299,443.

The present invention relates to the preparation and use of specifically activated carbon, and has special reference to the refining of hydrocarbons to remove impurities such as sulphur, coloring matter, gums, etc. The invention also has special reference to the refining of hydrocarbons in the vapor phase at, below, or above atmospheric pressure.

In refining hydrocarbons by passing vapors over or through activated materials, either of an adsorbent nature or of a catalytic nature, it is important to minimize decomposition or cracking of the hydrocarbons, and to remove the impurities in an efficient manner with efficient recovery of purified hydrocarbons.

The present invention aims to accomplish the foregoing, and for this purpose utilizes activated carbon as a refining agent. I have found that there are a great variety of activated carbons which are specifically different in action when employed in the process of this invention, and that none of the commercially available carbons on the market meet the most exacting requirements of the process. I have also found that specially prepared carbons are far more effective and efficient in carrying out the process. I have also found that specially prepared carbon has specific properties dependent upon the mode of preparation or activation, and in consequence I am enabled to prepare specific carbons for specific conditions that may be encountered in refining.

Accordingly, the present invention contemplates the preparation of specifically activated carbons, particular uses of the specifically activated carbons, and the refining of hydrocarbons by the use of activated carbons, particularly for the removal of sulphur, coloring matter and gums.

Various other objects and advantages of the invention will be apparent from the following detailed description of the process as contained in the various examples hereinafter given.

In order best to explain the nature of the invention I will first describe the process of refining, and then the methods of preparing the activated carbons used in refining, for the reason that knowledge of the use to which the carbon is put will make intelligible the reasons for varying the activation process.

In general, if a hydrocarbon vapor to be refined is passed over activated carbon maintained at a predetermined temperature, the sulphur content can be greatly reduced, and substantially removed, giving a sweet decolorized distillate. Under the same conditions, except for a lower carbon temperature, color can be completely removed, but the over-all sulphur reduction is less efficient, the first fractions being sweet, and the later fractions containing considerable sulphur compounds. Although sulphur removal is not effected in these later fractions at the same time color is removed, it has been found that the nature of the sulphur compounds is altered by passage through the carbon so that they can be readily removed by other methods. I have found that filtering the condensate through activated carbon, and even a water washing is effective to remove these altered sulphur compounds.

*Example I.*—As a particular example of the foregoing the following details of operation are given. Active carbon prepared according to the method of Example III, given below, is heated to a temperature of 610° C. in a suitable chamber through which vapors may be passed in contact with the carbon. Crude gasoline, having a sulphur content of 0.125%, obtained by topping crude oil from Artesia, New Mexico, is distilled through the heated carbon. The gums and color are removed, and sulphur content is reduced to 0.01% or less.

*Example II.*—Under the same conditions as in Example I, except as to changing the temperature from 610° C. to 500° C., the distillate is colorless, the first fractions are sweet, and the later fractions contain increasing amounts of hydrogen sulphide. The sulphur containing fractions may be sweetened by filtering through a layer of activated carbon, or by washing with water.

Consequently, the refining process comprises passage of the hydrocarbon vapors through heated carbon to effect removal or alteration of the impurities, followed, if necessary, by reduction in quantity or removal of residual impurities. The preferred process is distillation through carbon at a temperature which yields a colorless or suitably low-colored product, which may have no sulphur, or which may have an altered sulphur content capable of subsequent removal.

One advantage of this process is the permitted regeneration of the activated carbon in situ. I have found that steam may be passed through the carbon until the sulphur is removed, or that air may be employed in a like manner. The character of regeneration in each instance is different. With steam the regeneration may be effected at a temperature at least 510° C. or higher. At 510° C. the steam is very active which indicates that even lower temperatures could be used. Consequently, I do not consider the stated temperatures as limitations. In using steam in this manner sulphur is removed both as free sulphur and as hydrogen sulphide, and the products may be recovered from the liquid condensate, especially the free sulphur. Completion of regeneration is determined by failure to secure a positive sulphur test in the condensate with a plumbite solution.

When regenerating the carbon with air a lower temperature is employed, for example 370° C., in order to minimize combustion of the carbon. Sulphur in the carbon is burned to sulphur dioxide. I have found that activated carbon prepared from petroleum coke is extremely efficient in removing sulphur. Yet I find that this is not universally true, since its properties in this direction are dependent upon the process of activation. This will be clear from the following examples showing methods of activating the carbon and some of its varying properties.

*Example III.*—100 parts of petroleum coke of 12% volatile content is mixed with 35 parts of fuel oil of from 10° to 20° gravity on the A. P. I. scale. The mixture is then granulated in a suitable machine using very little pressure. The grains are fed continuously into a rotary furnace, the hottest zone of which is about 925° C. Steam is fed into the furnace at the discharge end in amount to equal twice the weight of the charge being introduced. A furnace passage of about 2 hours is employed. The recovered product amounts to 40% of the crude mixture, or 54% of the crude coke. One gram of the product will decolorize about 200 cc. of a standard methyl orange solution (1 gram in 5000 cc. of water) in 30 minutes at 85° C. It has an apparent density of 0.42. It has power to adsorb 6% to 7% of its weight of gasoline vapors at a temperature of melting ice. This carbon may be used for refining hydrocarbons as described in Examples I and II. Hydrocarbon so refined can be made completely free of sulphur by the process of Example II, filtering the distillate through an activated carbon. The gum content can be reduced from about 0.6 parts per thousand to about 0.02 parts per thousand. The refined product exposed to direct sunlight for weeks remains with an unchanged color of 29, Saybolt.

The foregoing treatment of the carbon to produce the desired capacity for removing sulphur is in some measure specific as evidenced by the following:

*Example IV.*—Repeating the process of Example III using a longer time of passage through the furnace, that is, an increase from 2 hours to 3½ hours, produces a carbon which will decolorize 350 cc. of the standard methyl orange solution as compared to 200 cc. of the two-hour product. The apparent density is 0.41 as compared to 0.42, but the gasoline adsorption power jumps from 6% up to as high as 20%. Its power to act on sulphur compounds in the oils is nil.

*Example V.*—Another process which activates petroleum coke so that it is efficient for removal of sulphur by my refining process is the same as one described and claimed in my copending application Ser. No. 299,441, filed August 13, 1928.

100 parts by weight of petroleum coke of 12% volatile content are mixed with 20% phosphoric anhydride in the form of ortho or meta-phosphoric acid, and 15% of a heavy hydrocarbon such as a residual oil. The mass is granulated and passed through a rotary furnace for a period of about 3 hours. The hottest zone is at a temperature of about 950° C. to 1000° C., although a variation of temperature is permitted. Steam is admitted at the discharge end in amount to equal about one-third the carbon charge being introduced.

The product runs about 55% of the coke initially charged. One gram of the carbon will decolorize 900 cc. of standard methyl orange solution, and will adsorb about 12% gasoline vapor at a temperature of melting ice. It is a very effective refining carbon for the process of this invention.

*Example VI.*—Another process of making suitable refining carbon from petroleum coke that softens when heated comprises granulating the coke and treating as in Example III with steam, but under different conditions. A furnace passage in 4 hours with a maximum furnace temperature of 900° C., and steam equal to twice the weight of the charge, produce a yield of 43%. The product will decolorize not over 50 cc. of standard methyl orange solution and will adsorb but 3% to 4% of gasoline vapor. In spite of low efficiency as indicated by these tests, it is extremely effective for my refining process. It is capable of removing all the sulphur, and at the same time producing a marketable distillate without any further treatment, eliminating even the water wash.

When this carbon is used it is maintained at a temperature of 370° C. when the hydrocarbon is distilled through it. It can be regenerated with steam as above described.

In order to show the value of my carbon as employed in my refining process I submit herewith a table showing the comparative tests made with commercial carbons and with my carbons.

conditions of activation, the type of hydrocarbon to be refined, and the conditions under which refining is effected.

The carbon prepared according to this invention is also capable of use like other activated carbons for absorbing and purifying processes, such as the absorption of gases and vapors of the saturated type of hydrocarbon, as in the methane series, which are constitu-

PROCESS III

*Comparison of different carbons for refining purposes*

| Name | Ash | Gasoline adsorption | 1/5000 methyl orange decol. | Grams to fill 1" x 4" tube | Gasoline distillation at 780° F. (300 c. c.) | | | | | Remarks |
|---|---|---|---|---|---|---|---|---|---|---|
| | | | | | Recovery | Color | Odor | Doctor after water wash | Sulphur in distillate | |
| Nuchar on 20 mesh | 4.2 | 7.2 (78°) | 300 | 8.3 | Per cent 93.0 | Strong yellow. | Cracked. | Almost sweet. | Per cent 0.024 0.023 | Much cracking. |
| Darco −12+20 mesh. | 13.7 | 15.1 (78°) | 350 | 17.0 | Leaks. | Light yellow. | Sweet. | Almost sweet. | 0.027 0.021 | Some cracking. |
| Norit A. granulated. | 7.9 | 20.5 (78°) | 300 | 9.0 | 94.0 | Strong yellow. | Fair. | Almost sweet. | 0.027 0.035 | Much cracking. |
| Norit STA −20 +50 mesh. | 3.1 | 9.0 (78°) | 300 | 14.0 | 89.5 | Dark yellow. | Fair. | Almost sweet. | 0.023 0.026 | Much cracking. |
| National Carbon Co. | 0.4 | 15.0 (78°) | 475 | 25.8 | 85.0 | Brown yellow. | Cracked. | Almost sweet. | 0.023 0.022 | Very much cracking. |
| Our #52 | 4.7 | 11.1 (62°) | 350 | 25.0 regenerated. | 97.5 | Light yellow. | Sweet. | Absolute sweet. | 0.003 0.002 | No cracking. |
| Our #51 | 1.8 | 9.1 (62°) | 350 | 22.0 regenerated. | 97.3 | Water white. | Sweet. | Sweet. | 0.004 0.003 | No cracking. |

In the above table the carbon designated No. 51 was made by the following process: 100 parts of coke containing 12% volatiles and ground to −200 mesh, and 25 parts of fuel oil (15° A. P. I.), were mixed, granulated, and heated in a furnace for three hours to a maximum temperature of 925° C., using 1.9 parts by weight of steam for each part of the crude mixture charged. Carbon No. 52 was prepared by mixing 100 parts of the same coke containing 12% volatiles, 30 parts phosphoric anhydride, and 15 parts of fuel oil (15° A. P. I.), granulating the mixture, and heating for three hours at 900° C., using two-thirds parts of steam for each part of the crude mixture.

It is to be noted particularly that the time of activation of the carbon is comparatively short considering the time required by other processes. Although there is no apparent relation between the time of treatment and the power to remove sulphur, it may be stated generally that the generally short time for activation favors this property. The decolorization test and the vapor adsorption test appear to have no significance in indicating the power to remove sulphur. The property is no doubt dependent upon complex relations involving the type and character of the activation process, the type of raw material employed as a base for the carbon, the ents of natural gases; for unsaturated and other gases, such as those arising in refining operations, particularly those from pressure stills; for absorption of casing head gas; for toxic gases, like those encountered in industry and in warfare; for purification of gases like carbonic acid by a selective retention of impurities from the gas when the absorbed gas is removed from the carbon.

From the foregoing description and the above table it may be readily comprehended that I have provided a carbon and a refining process that are effective and efficient. It is to be understood that the invention is not to be limited by the details given in the foregoing examples, and that various changes may be made in accordance with the scope of the appended claims.

I claim:

1. In a hydrocarbon refining process employing activated carbon made from petroleum coke for removal of sulphur, the method of regenerating the carbon which comprises subjecting the sulphur-bearing carbon to the action of high temperature steam heated to substantially 1050° F. whereby a chemical reaction occurs to expedite the removal of the sulphur.

2. In a hydrocarbon refining process employing activated carbon made from petroleum coke for removal of sulphur, the method of regenerating the carbon which comprises subjecting the sulphur-compound-bearing carbon to the action of steam at a temperature not below 1050° F. whereby a chemical reaction converts the sulphur compounds to sulphur and hydrogen sulphide which are removed by the sweeping action of the steam.

PAUL ZURCHER.